G. W. BLAIR.

MANUFACTURE OF GLASSWARE.

No. 10,753. Reissued Aug. 10, 1886.

ATTEST.

Wm. H. Scott.

Harry L. Amer.

INVENTOR.

George W. Blair by his attys

Bakewell & Kerr

N. PETERS, Photo-Lithographer, Washington, D. C.

UNITED STATES PATENT OFFICE.

GEORGE W. BLAIR, OF PITTSBURG, PENNSYLVANIA.

MANUFACTURE OF GLASSWARE.

SPECIFICATION forming part of Reissued Letters Patent No. 10,753, dated August 10, 1886.

Original No. 337,656, dated March 9, 1886. Re'ssue No. 10,712, dated April 20, 1886. Application for reissue filed July 17, 1886. Serial No. 208,314.

*To all whom it may concern:*

Be it known that I, GEORGE W. BLAIR, of Pittsburg, in the county of Allegheny and State of Pennsylvania, have invented a new and useful Improvement in the Manufacture of Glassware; and I do hereby declare the following to be a full, clear, and exact description thereof, reference being had to the accompanying drawings, forming part of this specification, in which—

Figure 1:
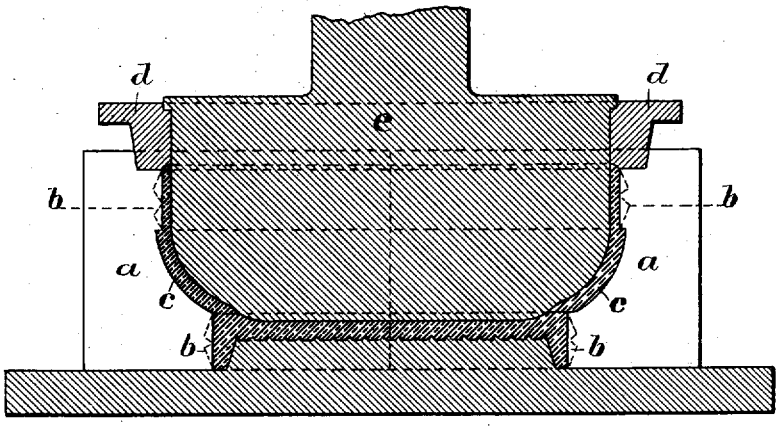
Figure 2:
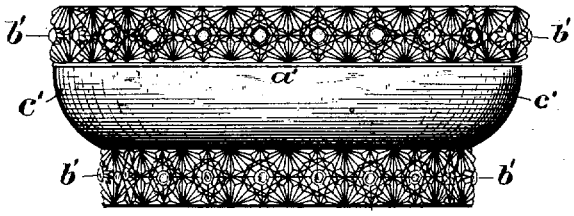

Figure 1 is a section of a glass-mold for forming a glass bowl or nappy. Fig. 2 is a view of the bowl or nappy formed in the mold. (Shown in Fig. 1.)

The sectional mold *a* is formed with transverse bands or zones *b* of an ornamental indented pattern composed of geometrical or like figures and an intermediate or plain band or zone, *c*. On the top of the mold is a ring, *d*, through which the plunger *e* works, and which forms the upper edge of the article. The requisite quantity of plastic clear or crystal glass is placed in the mold *a* and then the plunger is caused to descend and press it into shape, the result being the bowl *a'*, having transverse bands or zones *b'* composed of geometrical prismatic figures or patterns and an intermediate plain band or zone, *c'*. The article is then annealed, after which the plain transverse zone *c'* is coated smoothly with a lustrous paint of the desired shade or color. The article is then placed in the oven and the color burned in. When finished, the colored band or zone has a lustrous quality, the effect of which is increased by the reflection of the light from the opposed sides of the figures on the alternate clear zones *b'*, while such zones are in turn lighted up and tinted by the reflection from the colored zone *c*. This effect may be less perfectly produced by the use of a non-lustrous paint on the horizontal zone *c*, in that case producing the effect in a common pressed article which has heretofore been obtained only in expensive blown, flashed, cut ware. I prefer however to produce the lustrous effect in the zone *c'*. The color is smoothly and evenly blended with the surface of the crystal glass and gives a mellow and beautiful effect to the entire article. The application and baking in of the lustrous color does not destroy the transparency of the plain band.

I believe it to be entirely new to decorate crystal glass with lustrous tints or colors, as described, and that the method of producing such an article, the clear surface of which is partly molded with a prismatic pattern which contributes to the production of an effect different from a mere contrast of colors, is also new.

While I have described my improvement in connection with a bowl, I do not limit myself thereto, as it is apparent that it is equally applicable to all other pressed articles of glass having contrasting plain and figured sections.

What I claim as my invention, and desire to secure by Letters Patent, is—

1. The method of making ornamented glassware, which consists in pressing a clear glass article with prismatic figured bands or sections, and interposed or alternate plain bands or sections, and then laying a lustrous transparent coloring-matter on the plain sections, and finally firing or baking the color in, substantially as and for the purposes described.

2. A pressed crystal glass vessel having transverse figured bands or sections with an interposed lustrous colored plain band or section, substantially as and for the purposes described.

3. A pressed crystal glass vessel having figured bands or sections with alternate lustrous tinted bands or sections, substantially as and for the purposes described.

In testimony whereof I have hereunto set my hand this 30th day of June, 1886.

GEORGE W. BLAIR.

Witnesses:
W. B. CORWIN,
JNO. K. SMITH.